Sept. 27, 1949.  W. N. BECK  2,483,255
METER CONTROLLED VALVE
Filed Sept. 29, 1945   2 Sheets-Sheet 1
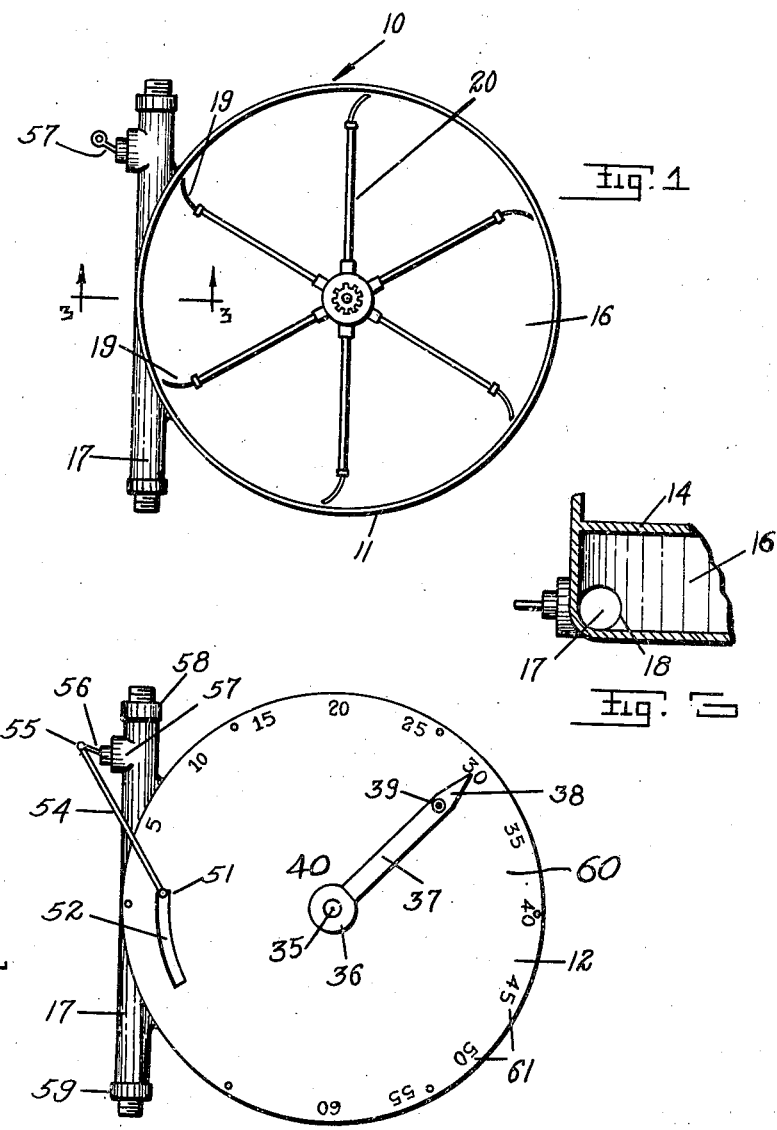
Inventor
William Nelson Beck
By Clarence A. O'Brien
and Harvey B. Jacobson
Attorneys Sept. 27, 1949.　　　　W. N. BECK　　　　2,483,255
METER CONTROLLED VALVE
Filed Sept. 29, 1945　　　　　　　　　　　2 Sheets-Sheet 2
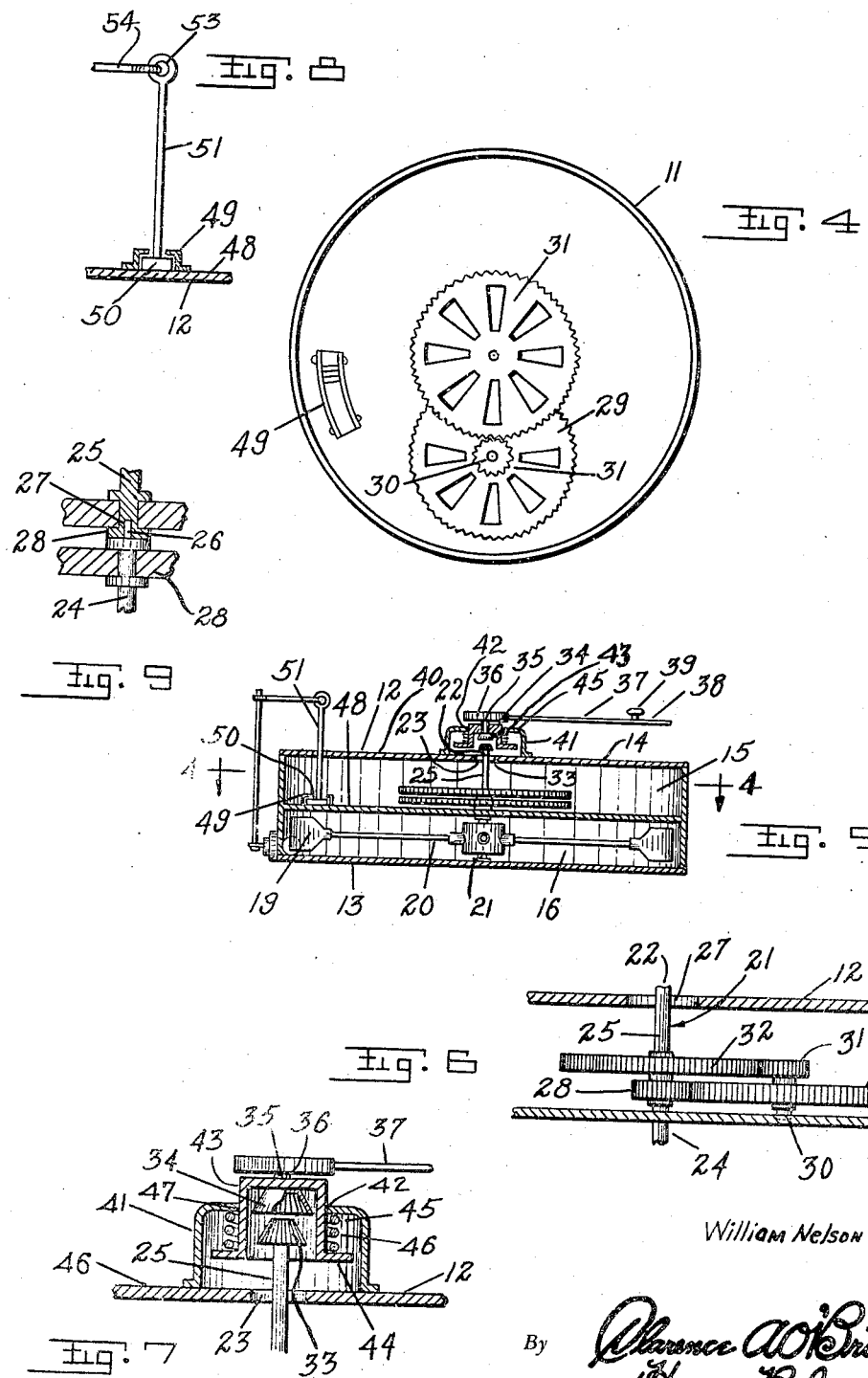
Inventor
William Nelson Beck Patented Sept. 27, 1949

2,483,255

UNITED STATES PATENT OFFICE 2,483,255

METER CONTROLLED VALVE

William Nelson Beck, Sioux Falls, S. Dak.

Application September 29, 1945, Serial No. 619,285

2 Claims. (Cl. 222—20)

My herein described invention has for an object to provide means whereby a flow of fluid through a pipe line may be automatically stopped at a predetermined time.

Another object of this invention is to provide an automatic cut-off for a fluid pipe line which may be set to cut off the fluid at any desired predetermined time.

A further object of this invention is to provide a water wheel actuated cut off valve.

A still further object of my invention is to provide means whereby a lawn sprinkler may be automatically cut off at a predetermined time.

Other features and advantages will become more readily apparent from the following description and the accompanying illustrative drawings in which:

Figure 1 is an elevational view of my automatic valve control, a face plate being removed, Figure 2 is an elevational view of the reverse side of the device, Figure 3 is a detail sectional view taken on line 3—3 of Figure 1, Figure 4 is a sectional view of the device taken on line 4—4 of Figure 5, Figure 5 is a transverse sectional view of the device, Figure 6 is an enlarged detail of a gear train, Figure 7 is an enlarged detail of a coupling, Figure 8 is a detail of a valve control member, and Figure 9 is a horizontal section of a part of Figure 6.

In the accompanying drawings as above enumerated and in the following specification, like characters of reference indicate like parts throughout and in which 10, indicates my valve structure which consists of a drum 11, having side walls 12 and 13, and an intermediate wall 14, forming two chambers 15 and 16, into the former of which enters and extends therethrough a pipe 17, the upper wall of which is cut away and opens within the chamber and is within the path of the paddles or fins 19, of a turbine or water wheel 20, rotatably mounted upon a shaft 21, having bearing on the wall 13, and through the wall 14, and the end 22, of which projects through the opening 23, in wall 12. The shaft 21, is in two sections 24 and 25, coupled for independent action by a pin 26, projecting from section 24, into an aperture 27, in section 25.

Fixed on shaft 24, is a pinion 28, which drives a spur gear 29, on a shaft 30, on which is also fixed a pinion 31, which in turn drives the spur gear 32, fixed on shaft section 25, the purpose of said gears being to greatly reduce the speed of the shaft section 25. The said end 22, of the latter shaft terminates in a cone clutch member 33, adapted for normal engagement with a female cone clutch element 34, to the outer terminal 35, of which is fixed the end 36, of an indice arm 37, upon the free end 38, of which is a button 39, for manual manipulation of said arm.

Fixed on the outer face 40, of wall 12, is a housing 41, with a central enlarged opening 42, through which another cup 43, slidably projects. This cup 43, is provided with an inner annular flange 44, between which and the wall 45, of housing 41, seats a spring 46, coiled around the horizontal wall 47, of cup 43, the action of which spring is to normally force the cup within the housing and hold clutch elements 33 and 34, connected so that arm 37, will rotate in unison with gear 32.

Fixed on the surface 48, of wall 14, is a slide-way 49, for a slide member 50, to which is fixed a rod 51, operating through an arcuate slot 52, in the wall 12. Outwardly of the said slot the terminal 53, of the rod 51, has fixed thereto a link 54, the end 55, of which is pivotally connected to a valve control arm 56, for actuating a valve 57, in the intake end 58, of the pipe 17, the outlet end 59, of which is adapted for connection to a lawn sprinkler member or container. The outer surface 60, of wall 12, is plotted in minutes as at 61, as indicated in the illustrative drawings, however it is to be understood that the plotting may be hours, and as many of them as may be required, depending upon the particular purpose for which the device is to be used. In this connection, it might be stated that instead of plotting the dial 60, in hours, it may equally as well be plotted in gallons, in which case the device may be used in the automatic measurement of liquids, whereby one attendant could easily reset a number of the valves.

The operation of the device is very simple: End 58, of pipe 17, is to be connected to a water supply faucet by hose connection or directly and the end 59, connected by hose or directly to a sprinkler or other delivery source. The end 36, of arm 37, is then drawn out to permit resetting of said arm to the desired time from which the device is to hold valve 57, open and water turned on. The reduction gears are timed to conform to the dial indice. Water flows freely through pipe 17, until arm 37, reaches, engages and presses down rod 51, driving down link 54, and throwing valve arm 56, closing the valve and cutting off the further passage of water or other liquid through pipe 17.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. An automatic valve control comprising a housing having chambers therein, a partition in said housing separating said chambers, a turbine in one of said chambers, a shaft journaled in said partition having reduction gears associated therewith and secured to said turbine in the other of said chambers, a conduit extending through said housing, a valve in said conduit, a cage on said housing receiving the terminal portion of said shaft thereunder, an arm projecting from said cage, resiliently biased clutch means in said cage for releasably connecting said arm to the terminal portion of said shaft, an aperture in said housing, guide means on said partition adjacent said aperture, a rod passed through said aperture and disposed in said guide means engageable periodically by said arm and means connecting said rod to said valve for actuation thereof.

2. The invention recited in claim 1, said last mentioned means including a pitman.

WILLIAM NELSON BECK.

REFERENCES CITED

The following references are of record in the file of this patent:

UNITED STATES PATENTS

| Number | Name | Date |
| --- | --- | --- |
| 451,129 | Miller | Apr. 28, 1891 |
| 958,664 | Moore | May 17, 1910 |
| 1,861,170 | Yates | May 31, 1932 |